(12) United States Patent
Ohta

(10) Patent No.: US 6,373,980 B2
(45) Date of Patent: *Apr. 16, 2002

(54) IMAGE PROCESSING METHOD AND APPARATUS FOR TRANSFORMING THE COLOR SPACE OF ENTERED IMAGE DATA

(75) Inventor: Kenichi Ohta, Kawasaki (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,865

(22) Filed: Apr. 28, 1998

(30) Foreign Application Priority Data

May 12, 1997 (GB) .......................... 9-121290

(51) Int. Cl.[7] ................................. G06K 9/00
(52) U.S. Cl. .................... 382/167; 382/162
(58) Field of Search ............... 382/162, 163, 382/164, 165, 166, 167, 232; 358/444, 520, 518, 500, 503, 504, 517, 505; 395/131, 157; 364/518; 345/150, 199, 431, 200

(56) References Cited

U.S. PATENT DOCUMENTS

| | | | |
|---|---|---|---|
| 4,839,721 A | * 6/1989 | Abdulwahab et al. | 358/444 |
| 4,985,848 A | * 1/1991 | Pfeiffer et al. | 364/518 |
| 5,134,667 A | * 7/1992 | Suzuki | 382/167 |
| 5,146,592 A | * 9/1992 | Pfeiffer et al. | 395/157 |
| 5,187,570 A | * 2/1993 | Hibi et al. | 358/520 |
| 5,202,935 A | * 4/1993 | Kanamori et al. | 382/167 |
| 5,321,797 A | * 6/1994 | Morton | 395/131 |
| 5,343,312 A | * 8/1994 | Hibi et al. | 358/520 |
| 5,491,568 A | * 2/1996 | Wan | 358/518 |
| 5,493,415 A | * 2/1996 | Mita et al. | 358/444 |
| 5,497,431 A | * 3/1996 | Nakamura | 382/162 |
| 5,557,688 A | * 9/1996 | Nakamura | 382/164 |
| 5,699,489 A | 12/1997 | Yokomizo | 395/109 |
| 5,768,410 A | 6/1998 | Ohta et al. | 382/162 |
| 5,801,855 A | 9/1998 | Ohta | 358/518 |
| 6,108,008 A | * 8/2000 | Ohta | 345/431 |
| 6,172,681 B1 | * 1/2001 | Ueda | 345/431 |
| 6,232,954 B1 | * 5/2001 | Rozzi | 345/150 |

* cited by examiner

Primary Examiner—Phuoc Tran
Assistant Examiner—Amir Alavi
(74) Attorney, Agent, or Firm—Fitzpatrick, Cella, Harper & Scinto

(57) ABSTRACT

Data for color conversion which is previously stored in a ROM is transferred to a three-dimensional look-up table when a color copier is turned on. By referring to R, G, B, signals, which have been previously stored in a buffer memory, in accordance with M, C, Y, Bk signals output in synchronization with the printing operation of a printer, a CPU rewrites the data in the look-up table to appropriate data (M, C, Y, Bk output signal values). A color signal processing circuit refers to the updated look-up table and outputs M, C. Y, Bk color signals that correspond to entered R, G, B signals.

6 Claims, 12 Drawing Sheets

IMAGE PROCESSING METHOD AND APPARATUS FOR TRANSFORMING THE COLOR SPACE OF ENTERED IMAGE DATA

BACKGROUND OF THE INVENTION

This invention relates to an image processing apparatus and method for transforming the color space of entered image data.

One typical example of an image processing apparatus that has become popular in recent years is a color copier which reads a color document upon separating the document into each of its colors pixel by pixel and prints a reproduced image of the color document based upon the separated digital color component signals obtained by reading the document. A color copier of this type executes processing to separate the color document into the three colors R (red), G (green) and B (blue) and converts these colors to the three primary colors C (cyan), M (magenta) and Y (yellow) of a subtractive color mixture.

FIGS. 10 and 11 are diagrams useful in describing processing for the conversion of color signals in accordance with an example of the prior art.

As shown in FIG. 10, image signals of the three primary colors R, G, B obtained by color separation enter signal processing circuits 1, 2, 3, respectively, whence there are obtained the C, M and Y color signals, respectively.

A conversion method for generating the C, M, Y signals from the R, G, B color signals is so-called masking, expressed by the following equations (where Aij are coefficients decided in dependence upon the characteristic of the output device), executed by the signal processing circuits 1, 2, 3:

Signal processing circuit 1: $C = A11 \times R + A12 \times G + A13 \times B$

Signal processing circuit 2: $M = A21 \times R + A22 \times G + A23 \times B$

Signal processing circuit 3: $Y = A31 \times R + A32 \times G + A33 \times B$

Another available method does not rely upon taking the sum of products by the signal processing circuits 1, 2, 3. According to this method, the results of the arithmetic operations are stored beforehand in a memory serving as a look-up table and the results of these operations are read out of the look-up table and delivered as outputs in response to R, G, B signal values input to the table.

In the arrangement where the results of arithmetic operations are read out of a look-up table, the number of required addresses for the storage areas will be $2^{24}$ (i.e., more than 16,000,000) if each of the entered R, G, B signal values is expressed by eight bits. Consequently, this approach is not realistic in view of the high cost of the memory required.

Accordingly, a converting circuit of the kind shown in FIG. 11 is provided for each of the C, M, Y signals. This arrangement divides the input R, G, B signals into high-order bit data Ru, Gu, Bu and low-order bit data Rl, Gl, Bl by a high-order/low-order bit dividing circuit 11. Only calculated results (namely the C, M, Y color signal values) that correspond to the high-order bit data Ru, Gu, Bu are stored beforehand in a table memory 13, which is a three-dimensional R, G, B look-up table. When the high-order bit data Ru, Gu, Bu of certain R, G, B color signal values is input to the table memory 13, the latter produces an output value 14 corresponding to this high-order bit data. The output value 14 and the low-order bit data Rl, Gl, Bl enter an interpolating circuit 15, which outputs a color signal 16 that is the result of subjecting the output value 14 to linear interpolation in dependence upon the low-order bit data Rl, Gl, Bl. (FIG. 11 illustrates a state in which the interpolating circuit 15 outputs the C signal.) In accordance with this arrangement, the number of storage area addresses of the table memory 13 need only be that required by the number of high-order bits. For example, if the high-order bits consist of three bits for each color, then the number of storage area addresses required will be $2^9$ (i.e., 512), thereby making it possible to reduce storage area capacity.

It should be noted that the data stored in the table memory 13 in advance is not a data continuum. Accordingly, if the low-order bit data Rl, Gl, Bl is zero, the output signal 16 of the interpolating circuit 15 will correspond to the high-order bit data Ru, Gu, Bu and therefore correct color reproduction will be obtained. On the other hand, if the low-order bit data Rl, Gl, Bl is not zero, the output signal value 14 from the table memory 13 undergoes linear interpolation in the interpolating circuit 15 in conformity with the low-order bit data. As a consequence, the linear interpolation gives rise to interpolation error and color reproduction of the desired accuracy is not obtained.

SUMMARY OF THE INVENTION

Accordingly, the present invention has been devised in view of the aforesaid problem and its object is to provide an image processing apparatus and method in which it is possible to obtain accurate color reproduction using a look-up memory having a small storage capacity.

Another object of the present invention is to provide an image processing apparatus and method in which it is possible to readily generate a look-up table compensated for color reproducibility in relation to a specific color.

According to the present invention, the foregoing objects are attained by providing an image processing apparatus for transforming the color space of input image data, comprising: dividing means for dividing image data into data of high-order and low-order bits; a look-up table memory in which color data of a different color space corresponding to the number of high-order bits is stored in advance; color signal processing means for interpolating, on the basis of the data of the low-order bits, color data read out of the look-up table memory using the data of the high-order bits as an address, and outputting the interpolated color data; and rewriting means for selectively rewriting the color data at a prescribed address of the look-up table memory.

By way of example, the rewriting means includes: designating means for designating data of at least one color; generating means, in which high-order bits of the data that has been designated by the designating means are used as an address, for generating an address in the neighborhood of this address; and color data rewriting means for rewriting the color data of the look-up table memory that corresponds to the address generated by the generating means.

In another aspect of the present invention, the foregoing objects are attained by providing an image processing apparatus for subjecting image data to color processing, comprising: storage means for storing a look-up table having multi-dimensional inputs; input means for inputting color data of a specific color; arithmetic means for obtaining a relationship between input and output data of the look-up table that corresponds to a color in the neighborhood of the specific color; and modifying means for modifying a portion of the look-up table based upon the relationship between the input and output data obtained by the arithmetic means.

Further, according to the present invention, the foregoing objects are attained by providing an image processing method for transforming color space of input image data, comprising: a dividing step of dividing image data into data of high-order and low-order bits; a color signal processing step of interpolating, on the basis of the data of the low-order bits, color data that has been read out of a look-up table memory using the data of the high-order bits as an address, wherein color data of different color spaces corresponding to the number of high-order bits is stored in the look-up table memory in advance; and a rewriting step of selectively rewriting the color data at a prescribed address of the look-up table memory.

By way of example, the rewriting step includes the steps of: designating data of at least one color; adopting high-order bits of the designated data as an address and generating an address in the neighborhood of this address; and rewriting the color data of the look-up table memory that corresponds to the generated address.

In another aspect of the present invention, the foregoing objects are attained by providing an image processing method for subjecting image data to color processing using a stored look-up table having multi-dimensional inputs, comprising the steps of: inputting color data of a specific color; obtaining a relationship between input and output data of the look-up table that corresponds to a color in the neighborhood of the specific color; and modifying a portion of the look-up table based upon the relationship between the input and output data.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments in which a color image processing apparatus according to the present invention is applied to a color copier will now be described in detail with reference to the drawings.

First Embodiment

Figure 1:
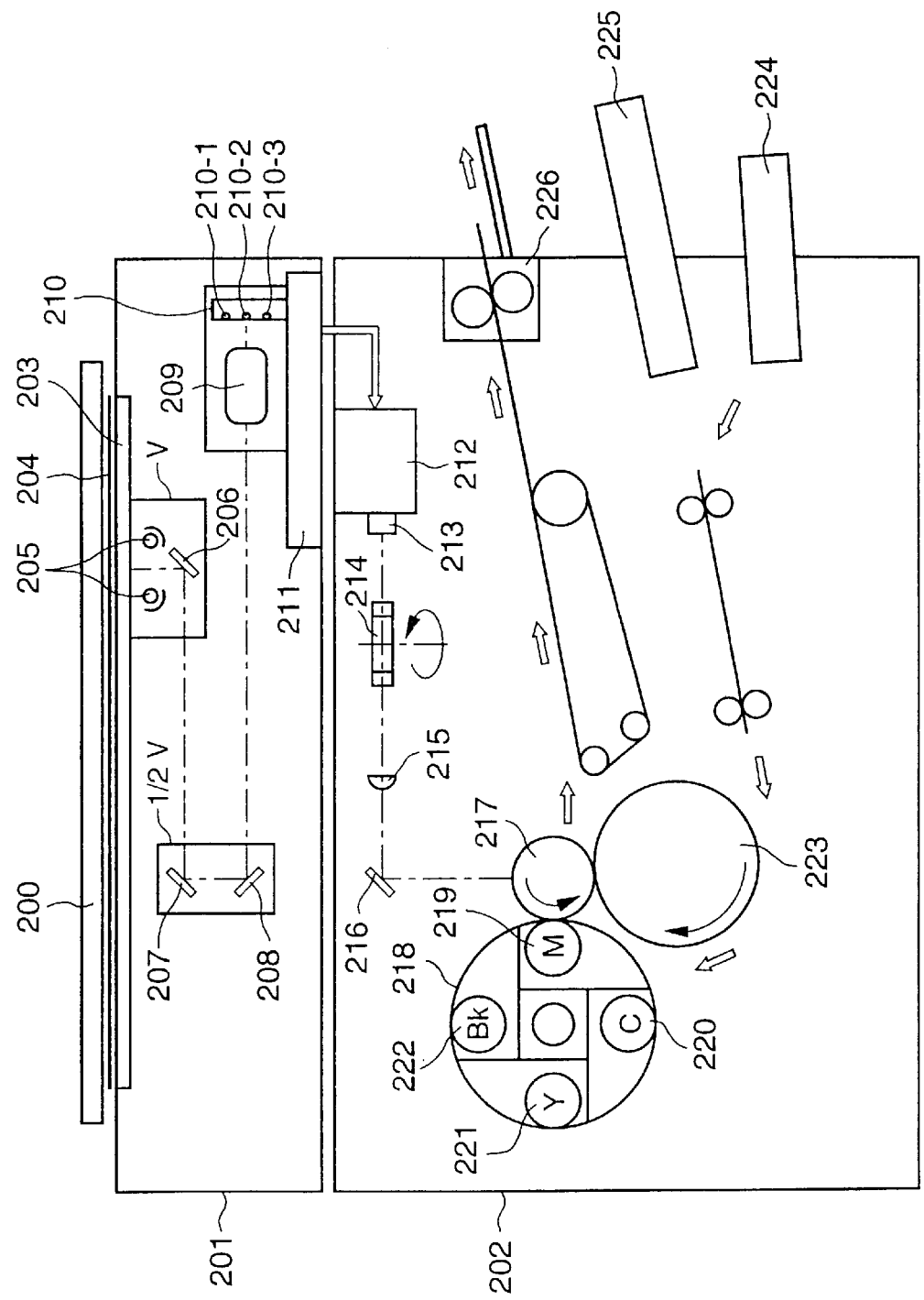
FIG. 1 is a diagram schematically showing the construction of a color copier according to a first embodiment of the present invention.

FIG. 1 is a diagram schematically showing the construction of a color copier to which the present invention is applied.

The color copier shown in FIG. 1 includes an image scanner 201 for reading an original and executing digital signal processing, and a printer 202 for printing the image of the original, which has been read by the image scanner 201, in full color on recording paper.

The image scanner 201 has a retaining plate provided with a mirror surface and a glass platen 203 on which an original 204 is placed. The original 204 is illuminated with light from a lamp 205 and light reflected from the original 204 is introduced to a lens 209 via mirrors 206, 207 and 208. The lens 209 forms an image of the reflected light on a three-line solid-state image sensor (referred to as a "CCD" below) 210. As a result, analog image signals of the three colors R, G, B constituting full-color information output by the CCD 210 are sent to an image processing section 211. The lamp 205 and mirror 206 are mechanically moved at a speed V, and the mirrors 207, 208 at a speed V/2, in a direction perpendicular to the electrical scanning (main-scan) direction of the CCD, whereby the entire surface of the original on the platen 203 is scanned (in the sub-scan direction). Here the original 204 is read as a resolution of 400 dpi (dots per inch) in both the main- and sub-scan directions.

The signal processing section 211 electrically processes the read image signal, separates the image signal into M, C, Y and Bk (black) components and sends the color components to the printer 202. With this color copier, one component of each of the color components M, C, Y, Bk is sent to the printer 202 per scan of the original in the image scanner 201 so that the printout of one copy of the original is completed by a total of four scans of the original.

The M, C, Y, Bk image signals sent from the image scanner 201 are delivered to a laser driver 212. The latter modulates and drives a semiconductor laser 213 in conformity with the image signals received. The laser beam is caused to scan a photosensitive drum 217 via a polygon mirror 214, f-θ lens 215 and mirror 216, whereby an electrostatic latent image is formed on the photosensitive drum 217 at a resolution of 400 dpi.

A revolving developing unit 218 comprises a magenta developing unit 219, a cyan developing unit 220, a yellow developing unit 221 and a black developing unit 222. The four developing units contact the photosensitive drum 217 one after another so that the electrostatic latent image that has been formed on the photosensitive drum 217 is developed by toners. Recording paper supplied from a paper cassette 224 or 225 is wound upon a transfer drum 223 so that the toner image that has been developed on the photosensitive drum 217 is transferred to the recording paper. The toner image is fixed to the recording paper by a fixing unit 226, after which the recording paper is discharged from the copier.

The image processing section 211 of the image scanner 201 will now be described.

Figure 2:
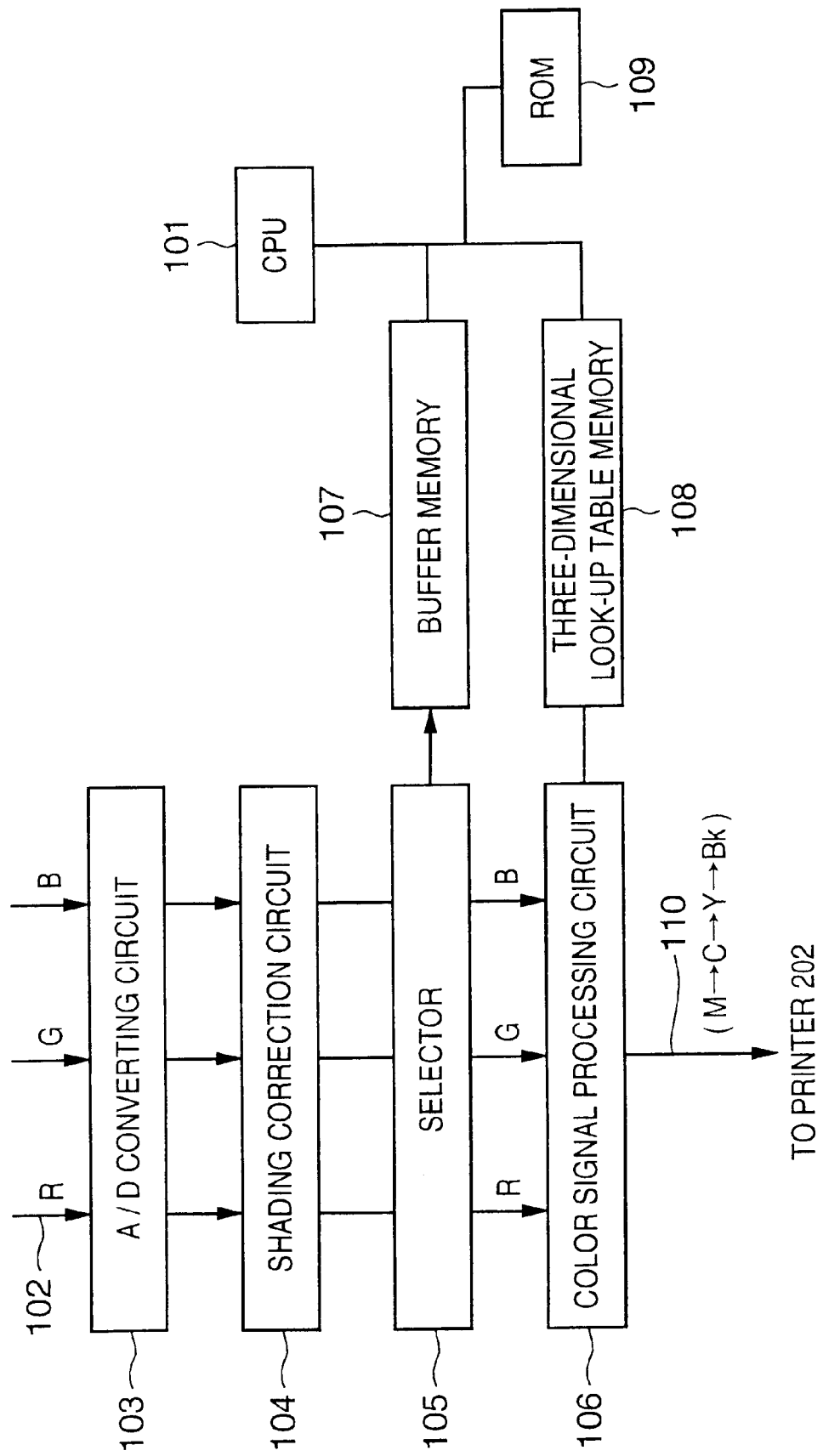
FIG. 2 is a block diagram showing a signal processing section according to the first embodiment of the present invention.

FIG. 2 is a block diagram showing the image processing section 211 according to the first embodiment of the present invention.

As shown in FIG. 2, the R, G, B signals obtained by separating the image of a color original into its color components pixel by pixel using the CCD 210 are converted to digital signals by an analog/digital (A/D) converting circuit 103, and the digital signals obtained by the conversion are sent to a shading correction circuit 104, which compensates the signals for sensitivity unevenness of the CCD 210 and uneven illumination of the original illuminating lamp. The resulting signals are sent from the shading circuit 104 to a selector 105.

In accordance with a control signal from a CPU 101, the selector 105 is changed over to send the R, G, B signals, which have been obtained by the shading correction circuit 104, to a color signal processing circuit 106 for processing to be described later, or to a buffer memory 107.

The color signal processing circuit 106 generates color signals M, C, Y, Bk 110 in order that the R, G, B signals (digital) may be printed by the printer 202. More specifically, in accordance with an indication from a control unit such as the CPU 101, the colors M, C, Y, Bk are converted to field-sequential color signals and the color signals are output in synchronization with the printing operation of the printer 202.

A look-up table 108 according to this embodiment is a writable memory that requires a storage holding operation to store data in the memory.

When the color copier is turned on, the CPU 101 transfers data for color conversion stored beforehand in a ROM 109 to the three-dimensional look-up table 108. An ordinary method may be used to obtain the data that is stored in the ROM and the method need not be described here.

The operation of the color copier having the construction set forth above will now be described with reference to FIG. 6.

Figure 6:
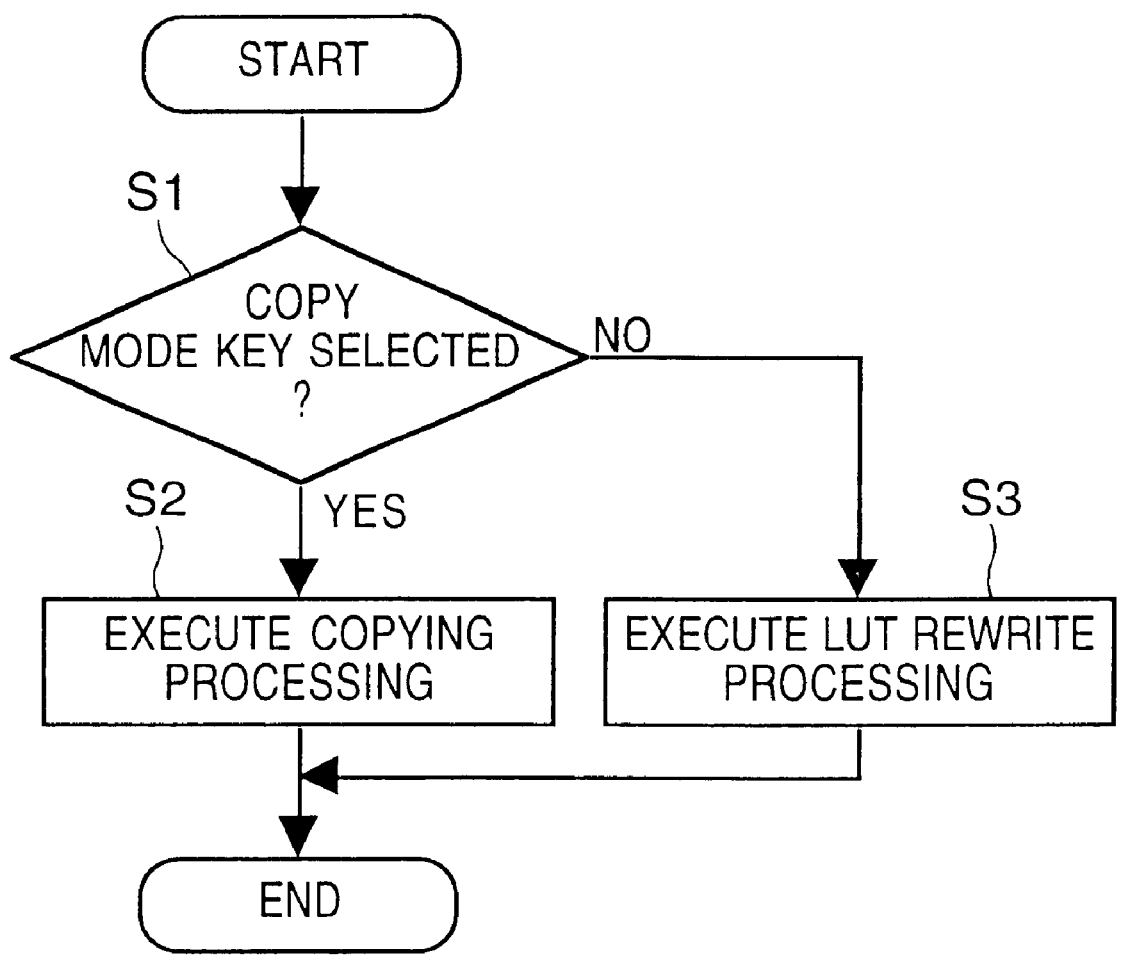
FIG. 6 is a flowchart illustrating the operation of the color copier according to the first embodiment of the present invention.

FIG. 6 is a flowchart illustrating the operation of the color copier according to the first embodiment of the present invention.

The CPU 101 determines, at step S1, whether the user has selected a copying mode at a control panel (not shown). Ordinary copying processing is executed at step S2 if the copying mode has been selected ("YES" at step S1). If the copying mode has not been selected ("NO" at step S1), then processing (described later) for rewriting the look-up table is executed at step S3.

According to this embodiment, the CPU 101 of the color copier refers to the R, G, B signals, which have been stored beforehand in the buffer memory 107, in accordance with any signal of the M, C, Y, Bk signals output in synchronization with the printing operation of the printer 202, and updates (rewrites) the data in the three-dimensional look-up table 108 to the appropriate data (M, C, Y, Bk output signal values). The method through which appropriate data to be rewritten is obtained will be described later.

The color signal processing circuit 106 refers to the updated look-up table 108 and outputs the M, C, Y, Bk color signals that correspond to the entered R, G, B signals.

Furthermore, in accordance with this embodiment, the printer 202 performs printing in the four colors M, C, Y, Bk. However, it goes without saying that printing may be performed only in the three colors M, C, Y or in five of more colors using special colors.

Color signal processing circuit 106

The details of the color signal processing circuit 106 will now be described.

Figure 3:
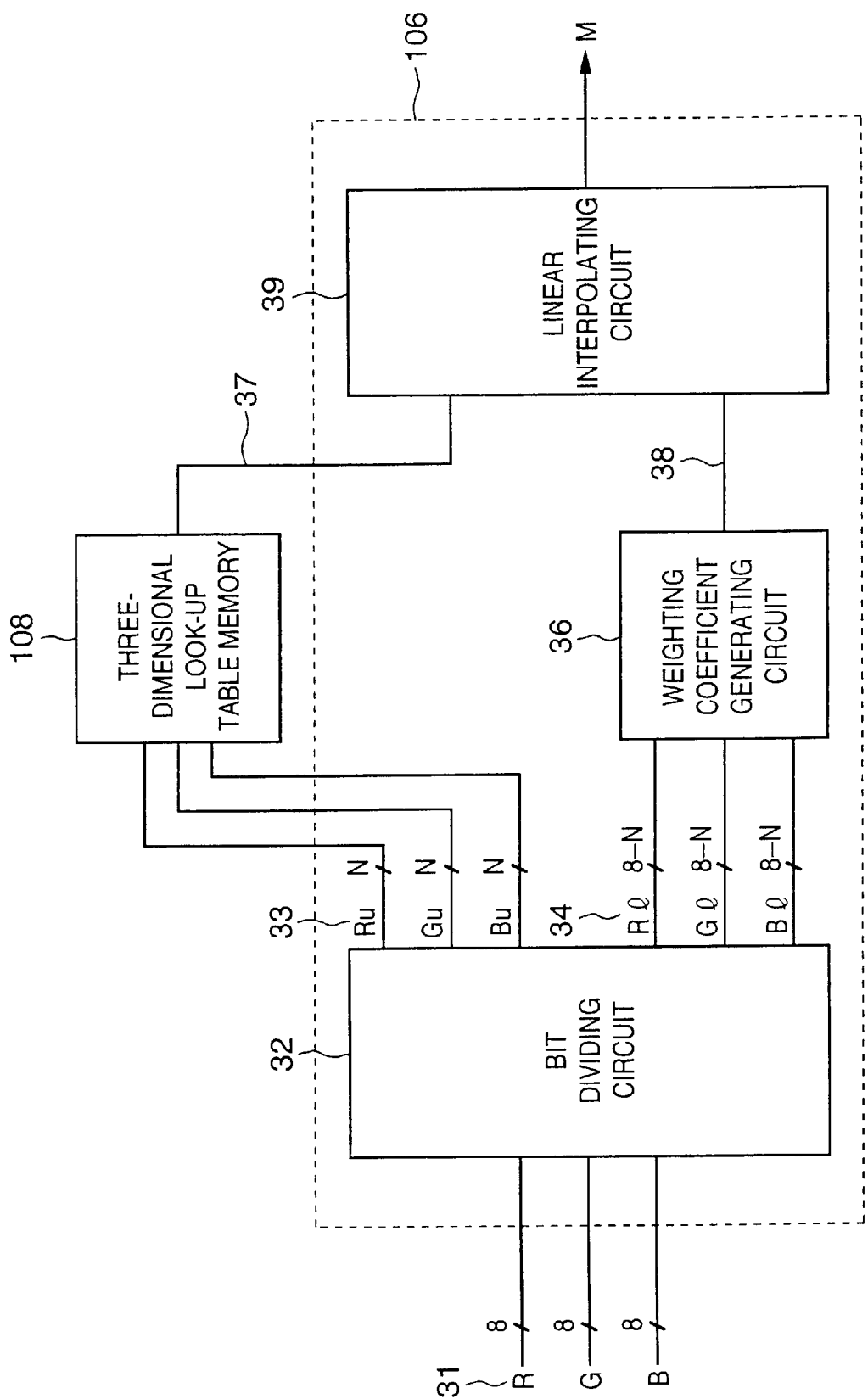
FIG. 3 is a block diagram of a color signal processing circuit included in the signal processing section of FIG. 2 according to the first embodiment of the present invention.

FIG. 3 is a block diagram of the color signal processing circuit 106 according to the first embodiment of the present invention.

As shown in FIG. 3, R, G, B signals 31 from the selector 105 are digital signals each composed of eight bits. These signals enter a bit dividing circuit 32 in parallel. The R, G, B signals 31 are divided into high-order bit signals Ru, Gu, Bu and low-order bit signals Rl, Gl, Bl, respectively, by the bit dividing circuit 32. If N represents the number of bits constituting each of the high-order bit signals Ru, Gu, Bu, then the number of bits constituting each of the low-order bit signals Rl, Gl, Bl will be 8−N because each of the input signals (the R, G, B signals 31) is composed of eight bits.

The high-order bit signals Ru, Gu, Bu enter the look-up table 108 as address signals and one set of data (the details of which will be described later) corresponding to these address signals are read from the data, which has been stored beforehand in the look-up table 108, as an output signal value 37. Meanwhile, the low-order bit signals Rl, Gl, Bl enter a weighting coefficient generating circuit 36, which generates a weighting coefficient 38 for an interpolation operation.

A linear interpolating circuit 39 uses the output signal value 37 from the look-up table 108 and the weighting coefficient 38 to perform linear interpolation (described later) and generates a magenta color signal, for example, as a first output signal.

Three-dimensional look-up table 108

The construction of the look-up table 108 and the method of obtaining the data that is stored beforehand in the ROM 109 will now be described. The data stored beforehand in the ROM 109 is decided at the design state and is set in the ROM at the time of shipping.

Construction of look-up table 108

Figure 4:
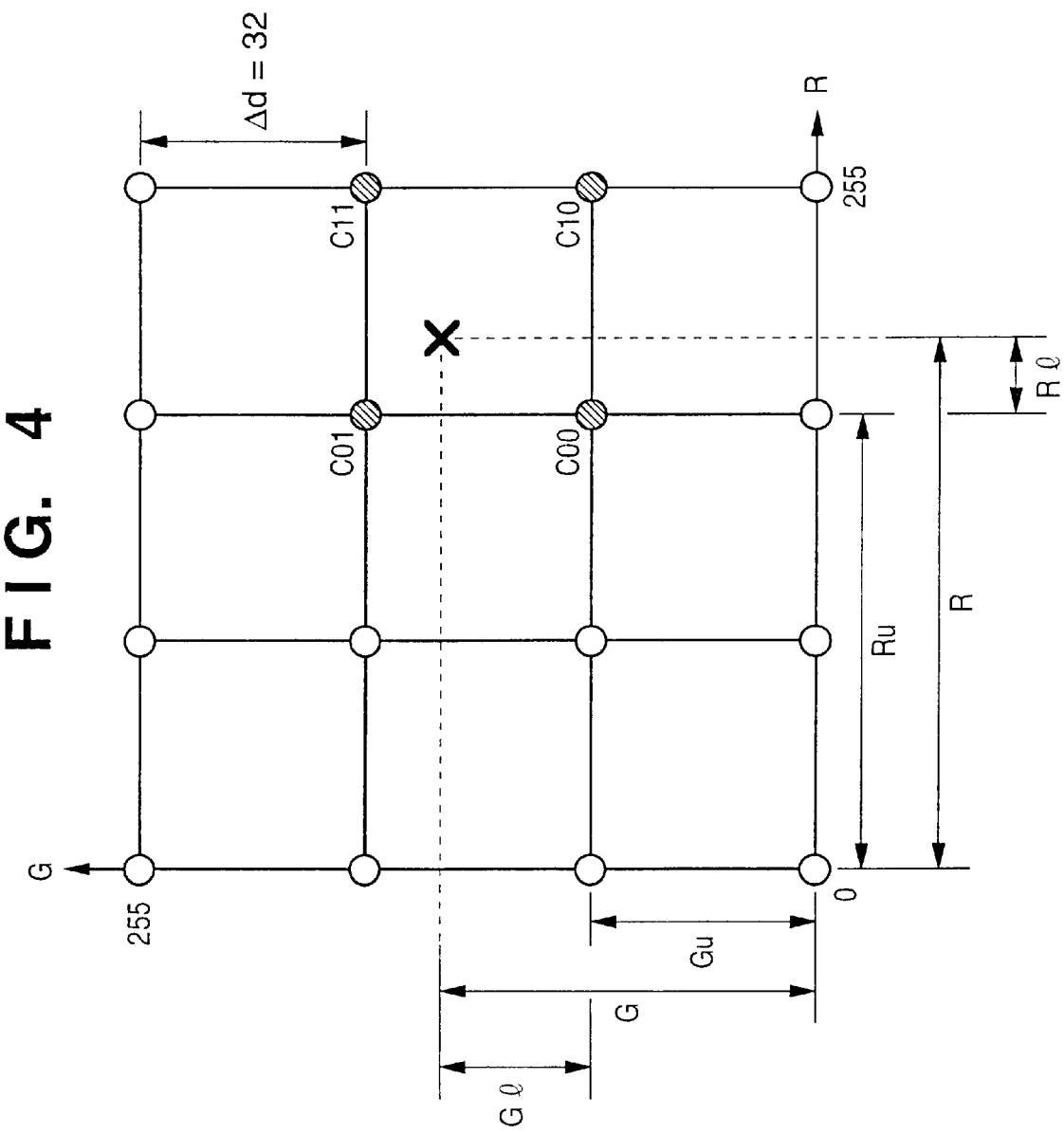
FIG. 4 is a diagram useful in describing the structure of a three-dimensional look-up table according to the first embodiment of the present invention.

FIG. 4 is a diagram useful in describing the structure of the three-dimensional look-up table according to the first embodiment of the present invention. To simplify the description, only the R and G input signals in two dimensions from among the three-dimensional input signals R, G, B will be discussed. The input signals R, G (each of which is an 8-bit digital signal) of the look-up table 108 are each represented by numerical values 0–255 arrayed horizontally and vertically on a two-dimensional plane, as shown in FIG. 4.

As illustrated in FIG. 4, output signal values from the look-up table 108 corresponding to input signal values of R and G have been stored in the look-up table 108 at positions stipulated in terms of coordinates by each of the input signal values of R (plotted along the horizontal axis) and G (plotted along the vertical axis), i.e., at positions indicated by the white or black circles. The positions of these white or black circles shall be referred to as "lattice points" below.

The number Q of lattice points and the spacing $\Delta d$ between neighboring lattice points are decided by the number N of high-order bits. That is, we have the following:

$Q=2^{(N\times 2)}$ $\Delta d=2^{(8-N)}$

Since FIG. 4 illustrates a case in which N=2 holds, we have Q=16, $\Delta d$=32.

First, with regard to arbitrary input signals R, G (indicated by the x mark in FIG. 4), the data at the four lattice points (the black circles in FIG. 4) decided by the high-order bit signals Ru, Gu is read out of the look-up table 108. Specifically, in FIG. 4 the four lattice points are C00, C10, C01, C11.

Next, the weighting coefficients 38 for linear interpolation are generated by the weighting coefficient generating circuit 36 from the low-order bit signals Rl, Gl. The calculation of the weighting coefficients 38 is equivalent to obtaining, by linear interpolation from the data at the four lattice points in the neighborhood of the point at the coordinates designated by the arbitrary input signals R, G, a signal to be output from the look-up table 108 to which the arbitrary input signals R. G (indicated by the x mark) have been applied.

A total of four of the weighting coefficients 38, namely one for each of the four items of lattice-point data (C00, C10, C01, C11), are required. Letting these coefficients be represented by A00, A10, A01, A11 in regular order, the coefficients are obtained in accordance with the following equations:

$$A00=(\Delta d-Rl) \times (\Delta d-Gl)$$

$$A10=Rl \times (\Delta d-Gl)$$

$$A01=(\Delta d-Rl) \times Gl$$

$$A11=Rl \times Gl$$

Next, the linear interpolating circuit 39 performs the operation indicated by the following equation using the calculated weighting coefficients A00, A10, A01, A11 and generates the output signal M, for example, as a first output signal:

$$M=(A00 \times C00+A10 \times C10+A01 \times C01+A11 \times C11)/(\Delta d^2)$$

The foregoing is the method of calculation in regard to the two-dimensional input signals R, G. The case for three-dimensional input signals will now be described with reference to FIG. 9 based upon the two-dimensional case described above.

Figure 9:
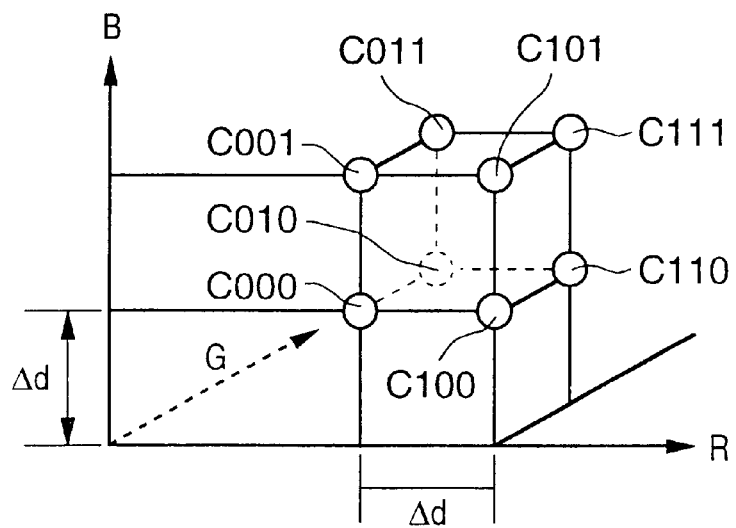
FIG. 9 is a diagram useful in describing the rewriting of the three-dimensional look-up table according to the first embodiment of the present invention.
Figure 10:
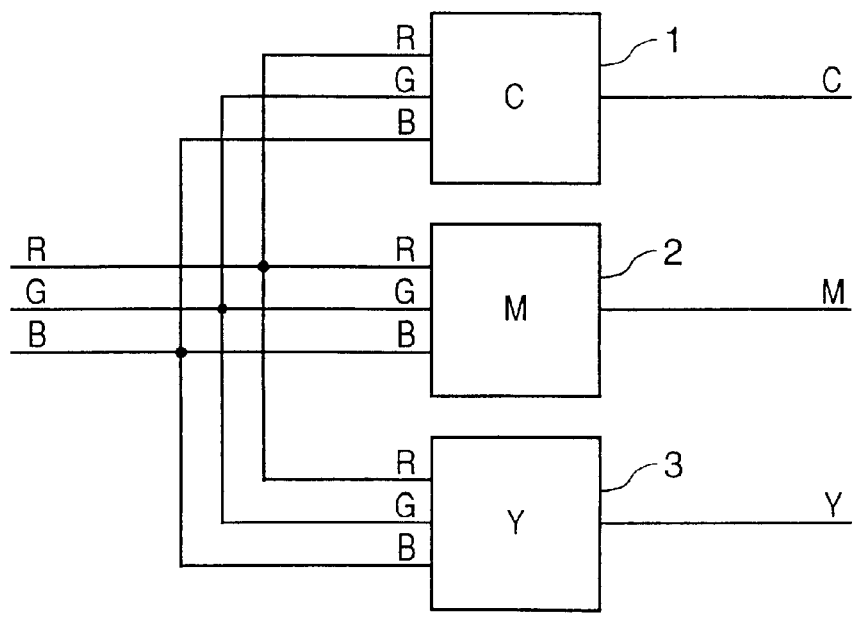
FIG. 10 is a diagram useful in describing processing for converting color signals according to the prior art.
Figure 11:
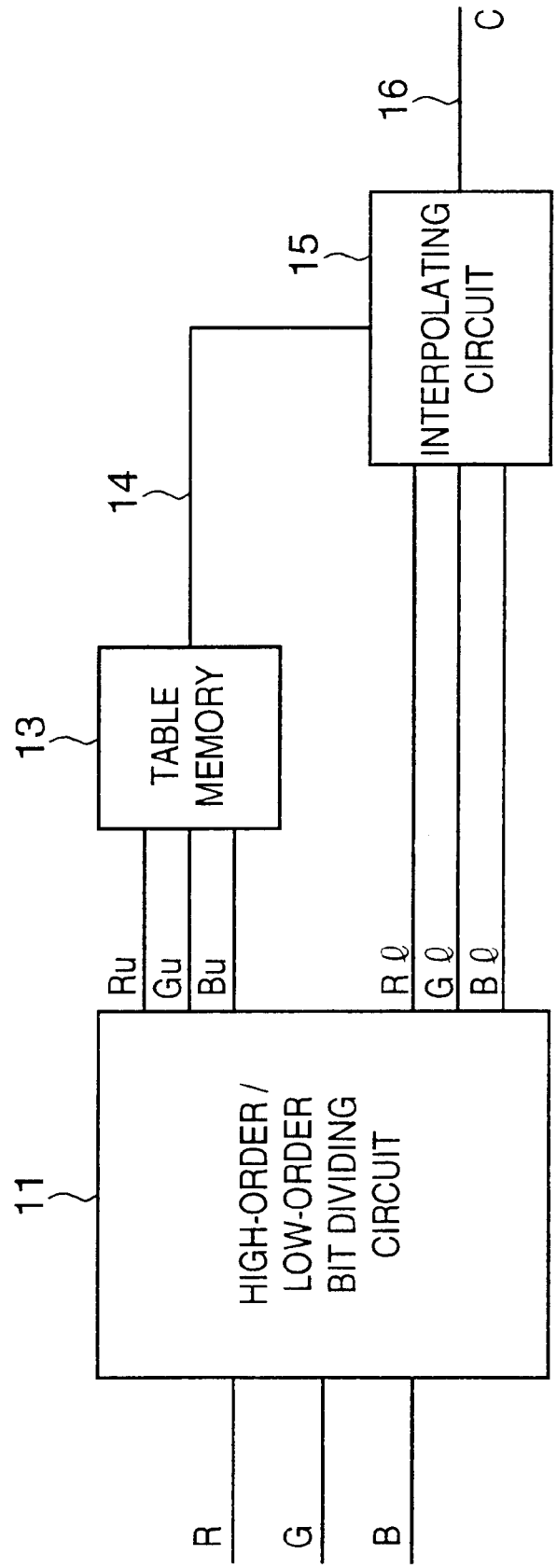
FIG. 11 is a diagram useful in describing processing for converting color signals according to the prior art.

FIG. 9 is a diagram useful in describing the rewriting of the three-dimensional look-up table according to the first embodiment.

As shown in FIG. 9, data at eight lattice points on the vertices of a cube in three-dimensional space is necessary in case of input signals in three dimensions. Let the lattice-point data be represented by C000, C100, C010, C001, C110, C101, C001, C111 in a manner similar to that of the two-dimensional case described above.

One weighting coefficient is required for each of the lattice points, for a total of eight. These are obtained in accordance with the following equations, in which the low-order bit signals of the three-dimensional input signals are represented by Rl, Gl, Bl:

$$A000=(\Delta d-Rl) \times (\Delta d-Gl) \times (\Delta d-Bl)$$

$$A100=Rl \times (\Delta d-Gl) \times (\Delta d-Bl)$$

$$A010=(\Delta d-Rl) \times Gl \times (\Delta d-Bl)$$

$$A001=(\Delta d-Rl) \times (\Delta d-Gl) \times Bl$$

$$A110=Rl \times Gl \times (\Delta d-Bl)$$

$$A101=Rl \times (\Delta d-Gl) \times Bl$$

$$A011=(\Delta d-Rl) \times Gl \times Bl$$

$$A111=Rl \times Gl \times Bl$$

Next, the linear interpolating circuit 39 performs the operation indicated by the following equation using the calculated weighting coefficients A000, A100, A010, A001, A110, A101, A011, A111 and generates the output signal M, for example, as a first output signal:

$$M=(A000 \times C000+A100 \times C100+A010 \times C010+A001 \times C001+A110 \times C110+A101 \times C101+A011 \times C011+A111 \times C11)/(\Delta d^3)$$

Further, the number Q of lattice points relating to the capacity of the three-dimensional look-up table and the lattice point spacing $\Delta d$ that has an influence upon the accuracy of the output signal are calculated as follows in case of the three-dimensional input signals R, G, B:

$$Q=2^{(N \times 3)}$$

$$\Delta d=2^{(8-N)}$$

The number N of bits of each of the high-order bit signals Ru, Gu, Bu is decided in dependence upon the accuracy desired to be achieved by color signal conversion. The larger the value of N is made, the smaller $\Delta d$ becomes and the closer the spacing of the lattice points in FIG. 4. Accordingly, though enlarging the value of N raises the accuracy of the output signal from the look-up table, the storage capacity of the look-up table required increases correspondingly (e.g., if N=2 holds, then we have Q=64, $\Delta d$=32).

Thus, as will be understood from the description rendered above, it is required that M, C, Y, Bk signals sufficient for the separated color signals R, G, B indicative of a color original to be reproduced accurately by the printer 202 be stored beforehand in the three-dimensional look-up table 108.

Method of deciding data stored beforehand in ROM 109 and read into look-up table 108

The data is decided as follows: The printer 202 drives the above-described printing mechanism to reproduce one certain color on recording paper based upon the M, C, Y, Bk color signals provided by the color signal processing circuit 106. Accordingly, in regard to one certain color on the original, the printer 202 compares the separated color signals R, G, B input to the color signal processing circuit 106 with separated color signals R, G, B, which correspond to the one certain color, obtained by converting the first-mentioned color signals R. G, B to M, C, Y, Bk signals, reproducing these on the recording paper by the printer 202 and performing color separation again by the scanner 201. If the compared R, G, B color signals agree, this means that the color on the original has been reproduced accurately.

Accordingly, the color that has been output on the recording paper by the printer 202 using the M, C, Y, Bk color signals is again subjected to color separation by the scanner 201 to obtain the separated color signals R, G, B, and these signals are represented as functions F of M, C, Y, Bk, as indicated by the following equations:

$$R=Fr(M,C,Y,Bk)$$

$$G=Fg(M,C,Y,Bk)$$

$$B=Fb(M,C,Y,Bk) \quad (1)$$

If a certain original is subjected to color separation by the image scanner 201 to obtain R, G. B signals, then, in order to realize accurate color reproduction, the values of R, G, B are substituted into the left side of Equations (1) and the inverse functions of these equations are found, whereby the M, C, Y, Bk signals are obtained. If the printer 202 is driven using the values of these signals, then a color the same as that of the original will be reproduced. If we let G represent the inverse function of the function F, then the M, C, Y, Bk sought will be expressed by the following:

$$M = Gm(R,G,B)$$
$$C = Gc(R,G,B)$$
$$Y = Gy(R,G,B)$$
$$Bk = Gk(R,G,B) \qquad (2)$$

However, the relations represented by Equations (1) are highly non-linear and it is difficult to obtain the functions Fr, Fg, Fb analytically. Accordingly, Gm, Gc, Gy, Gk, which are the inverse functions, also are difficult to obtain analytically. Therefore, rather than obtaining the M, C, Y, Bk that correspond to the R, G, B signals by way of Equations (1), a plurality of combinations of M, C, Y, Bk are prepared beforehand as output signals to be obtained from the look-up table 108, printing is actually performed by the printer 202 with regard to a certain combination of M, C, Y, Bk among these combinations, and the output obtained is subjected to color separation by the scanner 201, thereby obtaining R, G, B signal values that correspond to the certain combination of M, C, Y, Bk.

In actuality, where M, C, Y, Bk are represented by eight bits each, printout is performed in regard to all combinations of $$Mp = 0, 64, 128, 192, 255 \ (p=1\sim5)$$
$$Cq = 0, 64, 128, 192, 255 \ (q=1\sim5)$$
$$Yr = 0, 64, 128, 192, 255 \ (r=1\sim5)$$
$$Bks = 0, 64, 128, 192, 255 \ (s=1\sim5) \qquad (3)$$

[for a total of 625 colors (=5×5×5 colors)], and these outputs are subjected to color separation by the scanner 201 to obtain the resulting separated color signals R, G, B in advance. In other words, $$Rpqrs = R \ (Mp, Cq, Yr, Bks)$$
$$Gpqrs = G \ (Mp, Cq, Yr, Bks)$$
$$Bpqrs = B \ (Mp, Cq, Yr, Bks) \qquad (4)$$

are found beforehand and these are substituted for the functions Fr, Fg, Fb in Equations (1). That is, it is so arranged that the separated colors signals R, G, B corresponding to M, C, Y, Bk are obtained by interpolation from the aforesaid 625 values.

Since it is also difficult to analytically obtain Gm, Gc, Gy, Gk, which are the inverse functions of the function F, certain functions are presumed. For example, the linear functions given by the equations below are presumed to hold, where the coefficient Aij is an unknown number.

$$M = Gm(R,G,B) = A11 \times R + A12 \times G + A13 \times B$$
$$C = Gc(R,G,B) = A21 \times R + A22 \times G + A23 \times B$$
$$Y = Gy(R,G,B) = A31 \times R + A32 \times G + A33 \times B$$
$$Bk = Gk(R,G,B) = A41 \times R + A42 \times G + A43 \times B \qquad (5)$$

The relationship between M, C, Y, Bk and R, G, B also is highly non-linear and approximation is difficult with the linear functions of the kind indicated by Equations (5). In accordance with this embodiment, the above-mentioned relationship is dealt with as holding true only with regard to R, G, B signals in the neighborhood of a lattice point of interest, and the value of the coefficient Aij is found for every lattice point. This makes it possible to employ these simple approximate equations.

What are sought now are the M, C, Y, Bk color signal values that are to be stored in the three-dimensional look-up table 108. These signal values are values for accurately reproducing R, G, B input values, which are represented as a certain color at a lattice point, by the M, C, Y, Bk color components when printout is performed. Accordingly, first the coefficient Aij is set to a certain initial value and the R, G, B input signals corresponding to a certain lattice point are substituted into Equations (5) as R0, G0, B0 to find the M, C, Y, Bk values. Next, the values of the separated color signals of Equations (4) are interpolated based upon the M, C, Y, Bk values that have been obtained, whereby the corresponding R, G, B values are found. It will then suffice to decide the coefficients Aij of Equations (5) in such a manner that the R, G, B values obtained will become equal to the original R0, G0, B0 values. To accomplish this, an error function E is defined as follows:

$$E = [(R-R0)^2 + (G-G0)^2 + (B-B0)^2]^{1/2} \qquad (6)$$

the above-described procedure is applied repeatedly and the unknown coefficients Aij are decided using a well-known optimization technique such as the method of steepest descent so as to minimize the error function E.

Further, an arrangement may be adopted in which N sets R0i, G0i, B0i (where i=1–N) of color signals in the neighborhood of the lattice point of interest are set as R0, G0, B0, the separated color signal values Ri, Gi, Bi are obtained with regard to these sets through the above-described method, and the mean deviations of these values are evaluated. In this case the evaluation equation would be as follows:

$$E = \Sigma[(Ri-R0i)^2 + (Gi-G0i)^2 + (Bi-B0i)^2]^{1/2}$$

where Σ represents the sum total from 1 to N.

Thus, the coefficients Aij are found and the R, G, B values at the lattice point are substituted into the Equations (5) to obtain M, C, Y, Bk. This processing is executed for all lattice points and the M, C, Y, Bk obtained in correspondence with each of the lattice points are stored, whereby the three-dimensional look-up table 108 is obtained.

The data stored in the look-up table 108 is found through the procedure described above. In this embodiment, this data is registered beforehand in the ROM 109 and is transferred to the look-up table 108 by a command from the CPU 101 when the color copier is started or reset.

Method of obtaining rewritten data in look-up table 108

If the separated color signals R, G, B input to the color signal processing circuit 106 constitute data at a lattice point of the look-up table 108, then an accurate color reproduction is possible. However, the data stored beforehand in the look-up table 108 is not continuous data (a data continuum), as mentioned earlier. In a case where the separated color signals R, G, B are color signals offset from a lattice point, therefore, the M, C, Y, Bk signals output by the look-up table 108 are linearly interpolated by the linear interpolating circuit 39. Hence there is the possibility that color reproduction will not be accurately performed. According to the present invention, therefore, the R, G, B values in the look-up table 108 are updated (rewritten) by applying a procedure described below to improve the reproducibility of a color that is desired to be reproduced with particular accuracy.

Improving reproducibility of designated color

First, in order for a color (referred to below as a "specific color") desired to be reproduced with particular accuracy to be subjected to color separation by the scanner 201, the operator operates the scanner 201 and uses a position designating device or the like to read in the area of the specific color contained in the original. (It is also possible to read in the specific color from a color chip.)

When the specific color is read in, the CPU 101 switches the selector 105 of FIG. 2 to the side of the buffer memory 107 so that the image (the separated color signal values Rs, Gs, Bs) of the specific color is written to the buffer memory 107. Next, the CPU 101 extracts, from the image that has been written to the buffer memory 107, the R, G, B values Rs, Gs, Bs of the area (the area of the specific color) designated by the operator. Here E' of the following equation is used instead of Equation (6) as the error evaluation equation E:

$$E'=[(R-Rs)^2+(G-Gs)^2+(B-Bs)^2]^{1/2} \qquad (7)$$

Through the procedure described above, R0, G0, B0 are substituted for Rs, Gs, Bs and the coefficients Aij of Equations (5) are obtained in accordance with the evaluation equation E'. If the coefficients Aij have been found, then the lattice point R0, G0, B0 of the look-up table 108 is substituted into Equations (5) that now employ these coefficients Aij, thereby obtaining M, C, Y, Bk. These values are written to the look-up table 108 as the M, C, Y, Bk values of the above-mentioned lattice point. The lattice point at which the M, C, Y, Bk values are written is made only the lattice point in the neighborhood of Rs, Gs, Bs. In regard to other lattice points, the values obtained beforehand through the above-described procedure are stored as is. Accordingly, since only the separated color signals in the neighborhood of the specific color are rewritten, the reproduction of the other colors remains based upon the M, C, Y, Bk values previously stored in the look-up table 108. The conditions at this time are shown diagrammatically in FIG. 5.

Figure 5:
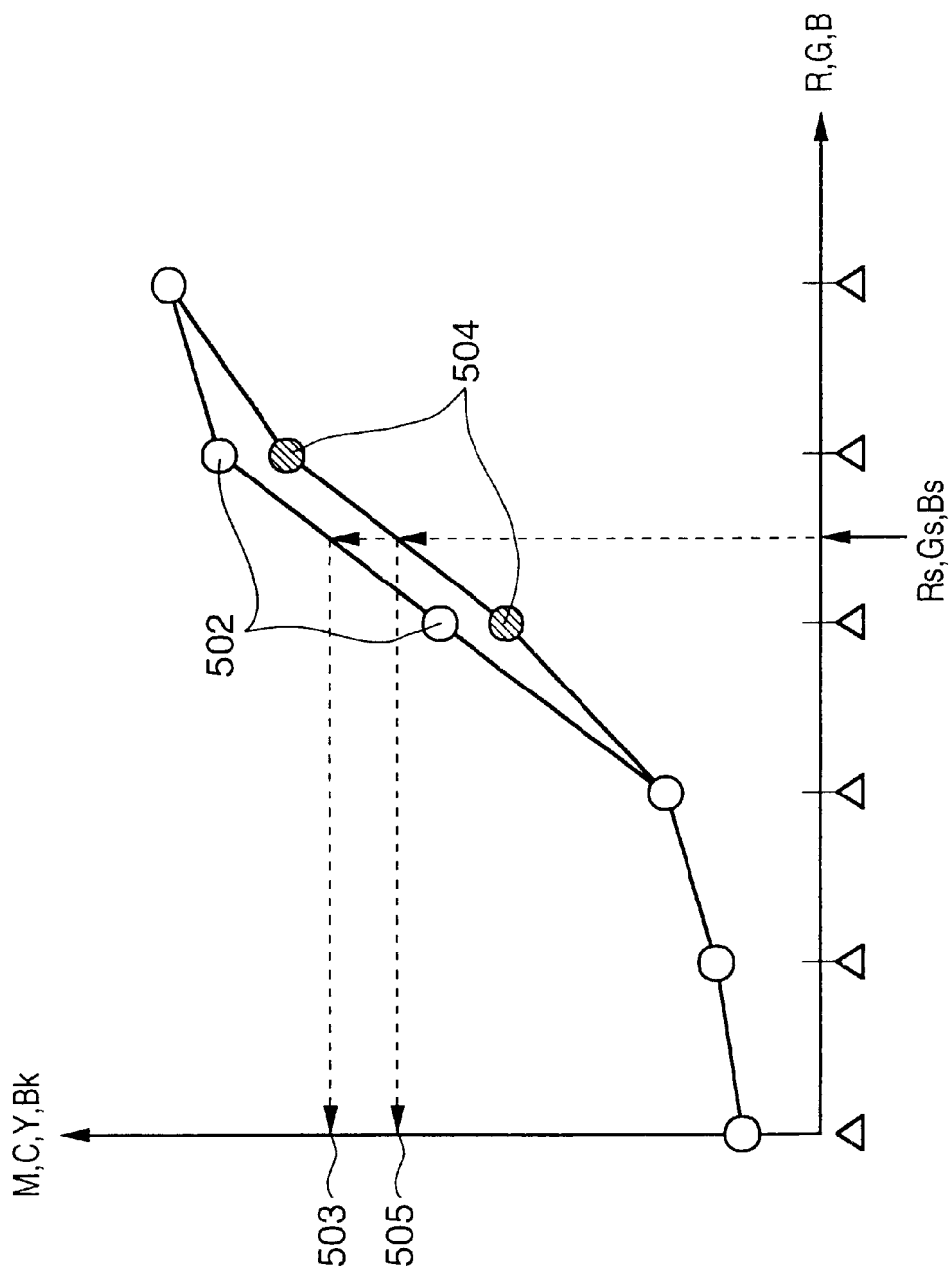
FIG. 5 is a diagram illustrating, in two dimensions, the rewriting of the three-dimensional look-up table according to the first embodiment of the present invention.

FIG. 5 is a diagram illustrating, in two dimensions, the rewriting of the three-dimensional look-up table according to the first embodiment of the present invention. In order to facilitate the description, the three-dimensional look-up table will be described based upon a one-dimensional look-up table.

As shown in FIG. 5, the input signals R, G, B of the look-up table 108 are plotted along the horizontal axis, and the output signal values M, C, Y, Bk are plotted along the vertical axis. Further, points at which the low-order bit signals Rl, Gl, Bl of the input signal R, G, B become zero are indicated by the triangle marks along the horizontal axis. The lattice points corresponding to these points are indicated by the white circle marks. Accordingly, the lattice points indicated by the white circles represent the output signal values M, C, Y, Bk that have been stored beforehand in the look-up table 108.

In this embodiment, output signal values are linearly interpolated from output signal values at the lattice points marked by the white circles in regard to input signals for which the low-order bit signals Rl, Gl, Bl are not zero. For example, in a case where input signal values are Rs, Gs, Bs along the horizontal axis in FIG. 5, an output signal value 503 is obtained by linear interpolation based upon the values at the two lattice points 502 marked by the white circles. However, since the output signal value 503 is interpolated from the two items at the aforementioned lattice points, the input signal colors Rs, Gs, Bs will not be accurately reproduced.

Accordingly, the above-described procedure for rewriting the look-up table 108 is applied to update the value at the lattice points 502 to values at lattice points 504 marked by black circles in FIG. 5, whereby a new output signal value 505 is obtained. The Rpqrs, Gpqrs, Bpqrs values are obtained by interpolation from the data of Equation (4) using the color signals M, C, Y, Bk indicated by the output signal 505, and the lattice points 504 are moved in such a manner that these values will approach Rs, Gs, Bs. The processing through which the Rpqrs, Gpqrs, Bpqrs values obtained by interpolation are thus made to approach the input signal values Rs, Gs, Bs is equivalent to moving the output signal values 504 corresponding to Rs, Gs, Bs by changing the coefficients Aij of Equation (5).

In accordance with the rewriting processing described above, only lattice points in the neighborhood of an input signal value regarding a specific color are shifted for the purpose of improving the reproducibility of the specific color. As a result, it is possible to reduce the influence on the input signals of other areas.

Second Embodiment

Figure 7:
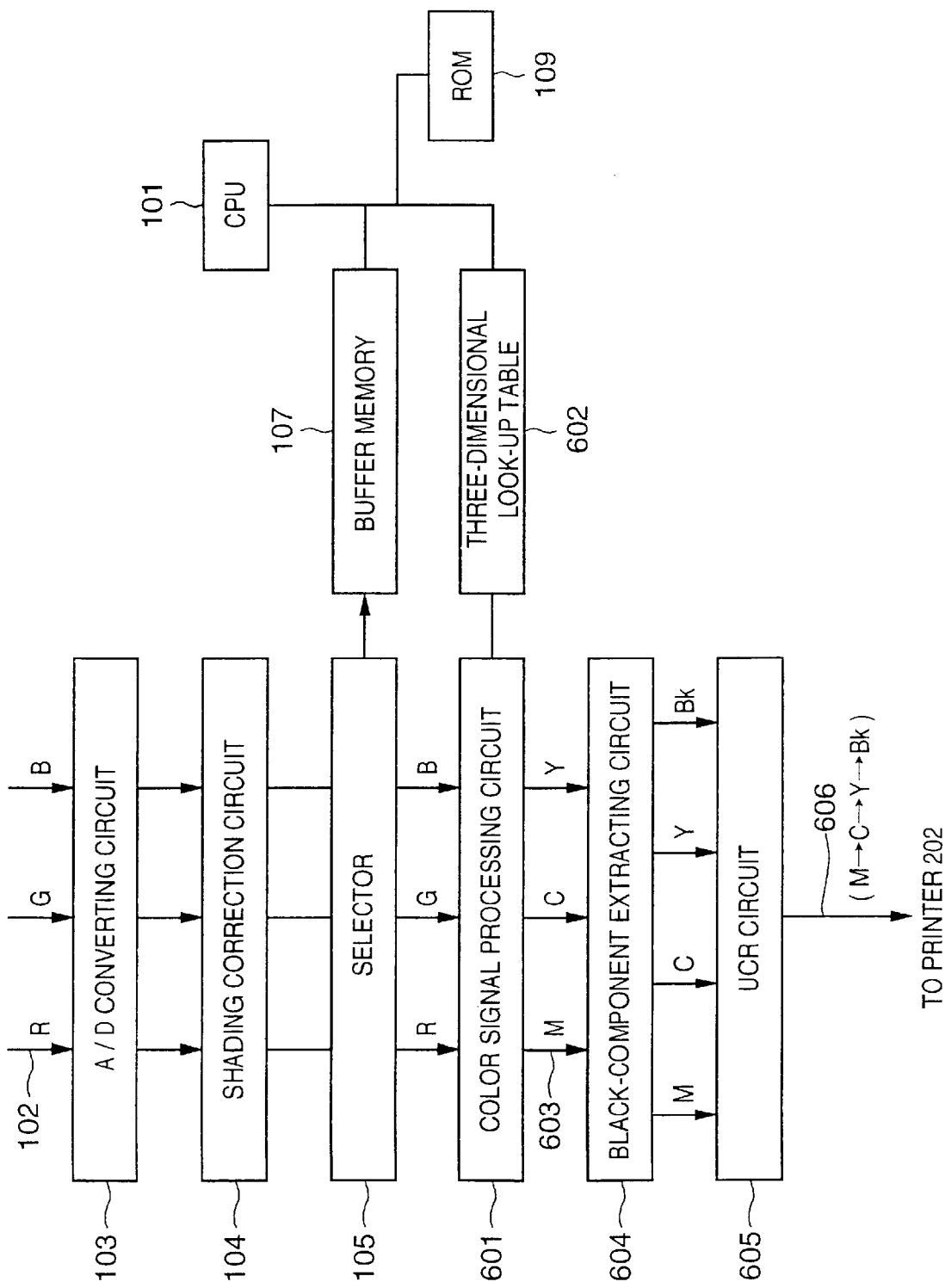
FIG. 7 is a block diagram showing a signal processing section according to a second embodiment of the present invention.

FIG. 7 is a block diagram showing a signal processing section according to a second embodiment of the present invention.

Blocks 103 through 105 and block 107 in FIG. 7 are the same as the identically numbered blocks in FIG. 1 and need not be described again. A color signal processing circuit 601 executes color signal processing substantially the same as that of the color signal processing circuit 106. However, the color signal processing circuit 106 shown in FIG. 3 is provided in the color signal processing circuit 601 to correspond to each of the colors M, C, Y and produces M, C, Y output signals 603. Accordingly, data for generating the three outputs M, C, Y is stored in a three-dimensional look-up table 602 as well.

The output signals of the color signal processing circuit 601 enter a black-component extracting circuit 604, which generates a black signal Bk in accordance with the following equation:

$$Bk = \min(C, M, Y)$$

A UCR (undercolor removal) circuit 605 executes the processing indicated by the following equations to produce final output signals M', C', Y', Bk':

$$M' = M - \alpha m \times Bk$$

$$C' = C - \alpha c \times Bk$$

$$Y' = Y - \alpha y \times Bk$$

$$Bk' = \alpha y \times Bk$$

where $\alpha m$, $\alpha c$, $\alpha y$, $\alpha k$ represent predetermined values.

By adopting this arrangement, only the three signals M, C, Y need be dealt with, as opposed to the aforementioned case where the four signals M, C, Y, Bk must be used in the Equations (2)~(5). This makes it possible to simplify the arithmetic operations.

Third Embodiment

Figure 8:
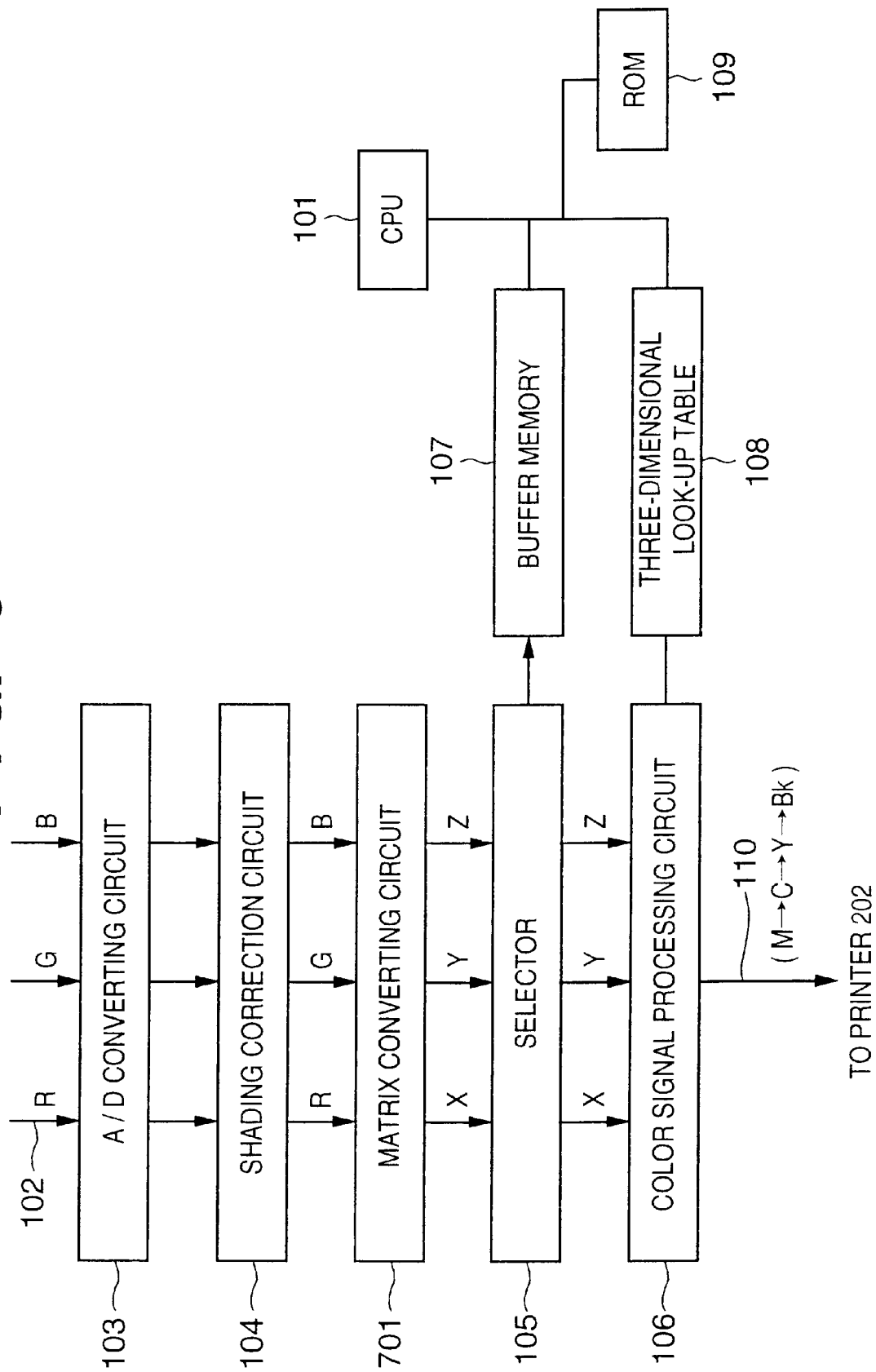
FIG. 8 is a block diagram showing a signal processing section according to a third embodiment of the present invention.

FIG. 8 is a block diagram showing a signal processing section according to a third embodiment of the present invention.

Blocks 103 through 110 in FIG. 8 are the same as the identically numbered blocks in FIG. 1 and need not be described again. In this embodiment, a matrix converting circuit 701 is provided at the output of the shading correction circuit 104. This circuit converts the separated R, G, B color signals to signals in a standard colorimetric system stipulated by the CIE (Commission Internationale de l'Eclairage). Specifically, the matrix converting circuit 701 performs the operations indicated by the following equations:

$$X=\beta11 \times R + \beta12 \times G + \beta13 \times B$$
$$Y=\beta21 \times R + \beta22 \times G + \beta23 \times B$$
$$Z=\beta31 \times R + \beta32 \times G + \beta33 \times B$$

Here the coefficients Bij are constants decided by the color separation characteristic of the CCD, etc., in the scanner 201. The X, Y, Z signals thus obtained are sent to the selector 105 in the same manner as set forth in the first embodiment.

In accordance with this arrangement, the color signals input to the color signal processing circuit 106 are standard colorimetric values. As a result, when the data stored in the look-up table 108 (the data stored beforehand in the ROM 109) is obtained, it is no longer necessary to read the printout from the printer 202 by the scanner 201. That is, it is possible to use values obtained by measurement in a standard calorimetric system.

It should be noted that the color signals are not limited to X, Y, Z and it is of course permissible to apply other standard color-space signals defined by the CIE.

Fourth Embodiment

In each of the embodiments described above, the object is to faithfully reproduce, at the time of printout, the separated color component signals Rs, Gs, Bs of a specific color desired to be reproduced with particular accuracy. With the fourth embodiment, it is possible to make a designation in such a manner that the specific color will be reproduced as a desired color different from the color on the original.

For example, the separated color component signals of the color on the original are Rs, Gs, Bs. In order to reproduce these as a color having somewhat more red than the precise color, the R, G, B values plugged into Equations (5) are left as Rs, Gs, Bs and the evaluation equation (7) is written as follows:

$$E=\{[R-(Rs+\Delta R)]^2+(G-Gs)^2+(B-Bs)^2\}^{1/2} \quad (8)$$

where ΔR may be specified by the operator or read in separately from the scanner 201 as the data of the color desired to be reproduced.

Fifth Embodiment

Figure 12:
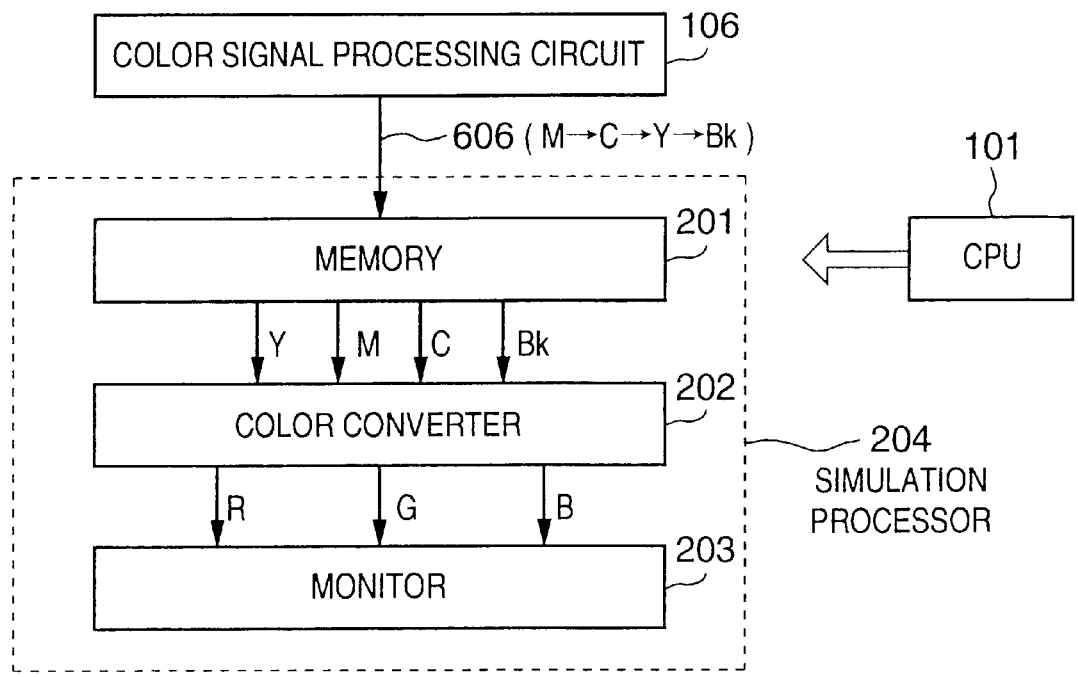
FIG. 12 is a block diagram useful in describing an image processing apparatus according to a fifth embodiment of the present invention.

In the fifth embodiment, a user interface relating to a color adjustment for modifying lattice-point data will be described with reference to FIGS. 12 through 14 as a modification of the foregoing embodiment.

According to this embodiment, the degree of color adjustment applied to an image that will be printed can be modified by the user at will based upon a displayed image that simulates the image that will be printed.

The construction of the image processing apparatus for generating the displayed image will be described first with reference to FIG. 12.

A display image is generated by a simulation processor 204 based upon the field-sequential digital signals M, C, Y, Bk 606 output by the color signal processing circuit 106 in FIG. 2. The first page of the field-sequential signals 606 is stored in a memory 201, Y, M, C, Bk indicating the same pixels are read out in parallel from the signals stored as digital data in the memory 201, and the signals that have been read out are output to a color converter 202. The entered Y, M, C, Bk image signals are converted to R, G, B signals by the color converter 22 based upon the output characteristic of the printer 202 and the display characteristic of a monitor 203, and the R, G, B signals resulting from the conversion are output to the monitor 203.

Read/write control of the memory 201 and control of the color converter 202 is carried out by the CPU 101.

It should be noted that the processing performed by the color converter 202 can be implemented by using the processing described in the specification of U.S. Ser. No. 683,704 (filed on Jul. 17, 1996), by way of example.

Figure 13:
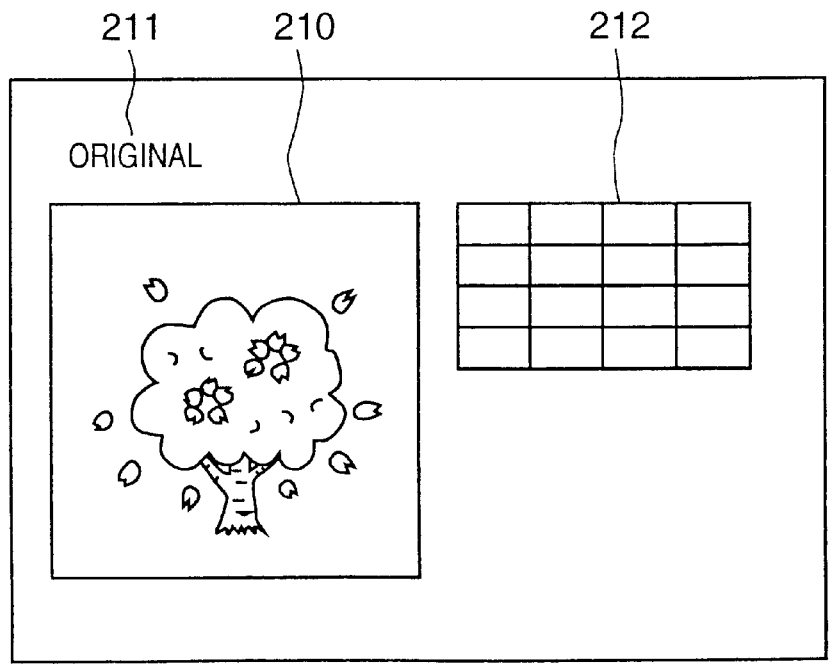
FIG. 13 is a diagram showing an example of a simulation screen used in the apparatus according to the fifth embodiment.
Figure 14:
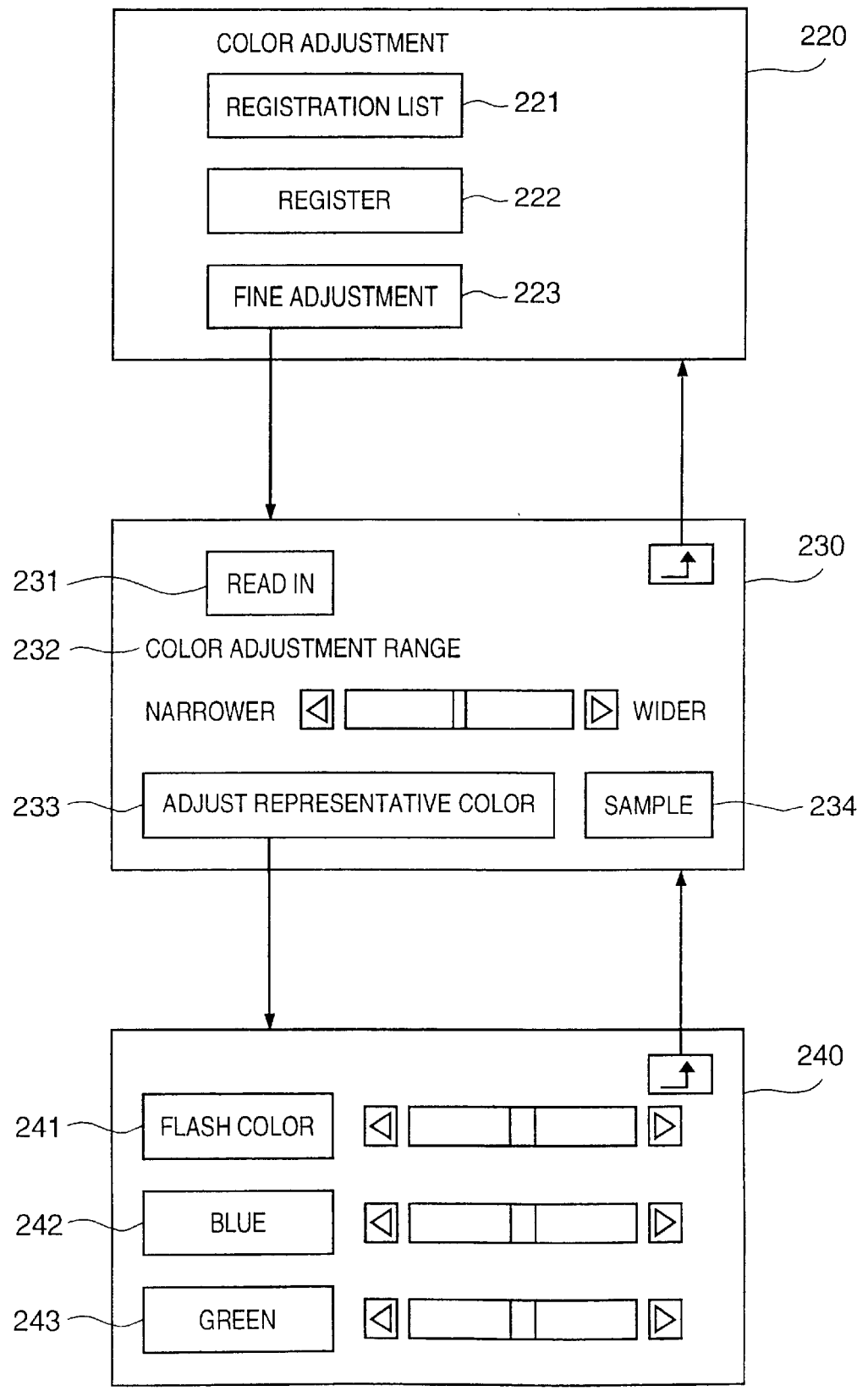
FIG. 14 is a diagram useful in describing a user interface used in the apparatus according to the fifth embodiment.

FIG. 13 illustrates an example of a simulation screen displayed on the monitor 203. As shown in FIG. 13, a simulation image 210 and the type 211 of the simulation image are displayed. In FIG. 13, the simulation image 210 corresponds to the image of an original that has been read by the image scanner 201.

It should be noted that the simulation screen differs depending upon the particulars specified by the user at a control panel (not shown).

The user interface for adjusting the color displayed on the control panel will be described with reference to FIG. 14.

First, the user operates the control panel (not shown) to select a color adjustment mode, whereupon a screen 220 is displayed on the monitor 203. Displayed on the screen 220 are a registration list button 221 for displaying a list of color adjustment conditions that have been registered, a registration button 222 for adding adjusted color adjustment conditions to the registration list, and a fine adjustment button 223 for performing a fine adjustment, described below.

If the fine adjustment button 223 has been selected by the user, then the monitor 203 displays a screen 230. Displayed on this screen are a read button 231 for executing the processing, illustrated in the first embodiment, that reads in a specific color from an original, a color adjustment range bar 232 for controlling the range of lattice points modified based upon the specific color that has been read in, a representative color adjustment button 233 for finely setting a representative color generally referred to as an "original color" and considered to be important in terms of image reproduction, and a sample button 234 for displaying a sample image that has been registered beforehand as a simulation image.

In the first embodiment, only a lattice point in the neighborhood of a color that has been read in is treated as a lattice point to be modified. However, a user preference is to be able to perform an overall adjustment of the color within a prescribed color range, as when performing a flesh color adjustment. According to the present embodiment, therefore, it is so arranged that an adjustment color range (i.e., a range of lattice points to be modified) can be controlled at will by the color adjustment range bar 232.

For example, assume that the three-dimensional look-up table 108 in FIG. 3 has a number of lattice points corresponding to N=3. If the color adjustment range bar 232 is shifted one step to the right from the leftmost position, which is the default position, the cube to which the signal values representing the color read in belong and data at the 64 lattice points in a cube contiguous to this cube are adjusted in the three-dimensional look-up table 108. To achieve the adjustment, lattice points constituting the cube to which the signal values representing the color read in belong are adjusted in the same manner as set forth in the first embodiment, and other lattice points are adjusted in such a manner that color continuity with lattice points not adjusted is maintained.

Further, the sample image is the image of a person suitable for performing a flesh color adjustment, by way of example. The manufacturer may prepare a plurality of sample images of persons, scenery and the like, or the user can register any desired image by reading in by the user using the image scanner 201. In other words, color adjustment is carried out using an image other than the image on an original.

If the user selects the representative color adjustment button 233 on the screen 230, then the monitor 203 displays a screen 240. By performing a color adjustment using the screen 240, a fine adjustment can be applied in simple fashion in relation to representative colors (flesh color, the color blue used to depict the sky or sea, and the color green used to depict foliage or the like) generally referred to as "original colors" and considered to be important in terms of image reproduction.

When the representative color to undergo color adjustment is selected by the user on screen 240, a pallet 212 (see FIG. 13) composed of colors related to the selected representative color is displayed on the display screen. A specific color used in adjustment can be selected by specifying, at the control panel, a number representing any color indicated in the pallet 212. By thus using the pallet 212, the required color can be simply selected by the user.

The screen 240 has a slide bar for each representative color so that the range of color adjustment can be set independently for each representative color. The default value of each slide bar is based upon the experience of the manufacturer and set for each color. For example, the range of adjustment of the flesh color is set by default to be narrower than that for the color blue or the color green.

In accordance with this embodiment, as described above, the user is capable of adjusting the three-dimensional look-up table 108 in a simple manner.

Further, in the foregoing embodiment, designating the specific color used in color adjustment is performed by reading the image on the original using the image scanner 201 and by specifying a pallet number using the control panel. However, the selection can be made by displaying a pointer on the monitor 203 and moving the pointer using a mouse or the like. If such an arrangement is adopted, a specific color can be designated from a sample image being displayed on the monitor as the simulation image. This makes it even easier for the user to designate the specific color required.

Other Embodiments

In the foregoing embodiments, only one output signal is produced for every color printed out. However, if an apparatus capable of printing M, C, Y, K simultaneously is used as the printer 202, then it can be so arranged that four different signals M, C, Y, K will be output in parallel.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing program codes for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the functions according to the embodiments, and the storage medium storing the program codes constitutes the invention.

The storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like working on the computer performs a part of or the entire process in accordance with the designation of program codes and implements the functions according to the embodiment.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

Thus, in accordance with the each embodiments described above, there are provided an image processing apparatus and an image processing method in which it is possible to obtain accurate color reproduction using a look-up memory having a small storage capacity.

Further, there are provided an image processing apparatus and an image processing method in which it is possible to readily generate a look-up table compensated for color reproducibility in relation to a specific color. It is also possible to adjust color reproducibility in regard to a desired color specified by the user.

As many apparently widely different embodiments of the present invention can be made without departing from the spirit and scope thereof, it is to be understood that the invention is not limited to the specific embodiments thereof except as defined in the appended claims.

What is claimed is:

1. An image processing method of generating a look-up table having a plurality of lattice-points, comprising:

a generating step of generating the look-up table; and
an adjusting step of adjusting the generated look-up table;
wherein said generating step includes:
  an outputting step of outputting a plurality of color patches from an output unit,
  an inputting step of inputting a measurement result of the outputted color patches, and
  a look-up table generating step of generating the look-up table in accordance with the inputted measurement result,
wherein said adjusting step includes:
  an adjusting range inputting step of inputting, in accordance with a user's's operation, a plurality of specific colors and an adjusting range corresponding to each of the plurality of specific colors, and
  a look-up table adjusting step of selecting and adjusting lattice-points of the generated look-up table corresponding to each of the inputted specific colors and the adjusting range thereof.

2. The method according to claim 1, wherein, in said adjusting range inputting step, a predetermined value corresponding to each of a plurality of representative colors is preset as a default range of the adjusting range.

3. The method according to claim 1, wherein the specific colors are selected in accordance with the user's operation being inputted by a user interface and said adjusting range inputting step includes:
   a selecting step of selecting, in accordance with the user's operation being inputted via the user interface, a kind of representative color from the preset plurality of representative color,
   a display step of displaying a plurality of colors corresponding to the selected kind of representative color, and
   a display step of displaying a plurality of colors corresponding to the selected kind of representative color, and
   a specific colors electing step of selecting, in accordance with the user's operation being inputted via the user interface, a color as the specific color to be adjusted from the displayed plurality of colors.

4. An image processing method of generating a look-up table having a plurality of lattice-points, comprising:
   a generating step of generating the look-up table; and
   an adjusting step of adjusting the generated look-up table;
   wherein said generating step includes:
      an outputting step of outputting a plurality of color patches from an output unit,
      an inputting step of inputting a measurement result of the outputted color patches, and
      a look-up table generating step of generating the look-up table in accordance with the inputted measurement result,
   wherein said adjusting step includes:
      an adjusting range inputting step of inputting, in accordance with a user's operation, a specific color and an adjusting range corresponding to the specific color, and
      a look-up table adjusting step of selecting and adjusting lattice-points of the generated look-up table corresponding to the inputted specific color and adjusting range thereof,
      wherein a predetermined value corresponding to a kind of a representative color is preset as a default range of the adjusting range, and
      when the representative color is selected as the specific color, the adjusting range is changeable in accordance with a user's operation.

5. A computer readable medium having recorded theron program codes for implementing a computer implementable method of image processing for generating a look-up table having a plurality of lattice-points, comprising:
   a code of a generating step of generating the look-up table; and
   a code of an adjusting step of adjusting the generated look-up table;
   wherein the code of said generating step includes:
      a code of an outputting step of outputting a plurality of color patches from an output unit,
      a code of an inputting step of inputting the measurement result of the outputted color patches, and
      a code of a look-up table generating step of generating the look-up table in accordance with the inputted measurement result,
   wherein the code of said adjusting step includes:
      a code of an adjusting range inputting step of inputting, in accordance with a user's operation, a plurality of specific colors and adjusting ranges corresponding to the plurality of specific colors, and
      a code of a look-up table adjusting step of selecting and adjusting lattice-points of the generated look-up table corresponding to each of the inputted specific colors and adjusting ranges thereof.

6. A computer readable medium having recorded thereon program codes for implementing a computer implementable method of image processing for generating a look-up table having a plurality of lattice-points, comprising:
   a code of a generating step of generating the look-up table; and
   a code of an adjusting step of adjusting the generated look-up table;
   wherein the code of said generating step includes:
      a code of an outputting step of outputting a plurality of color patches from an output unit,
      a code of an inputting step of inputting a measurement result of the outputted color patches, and
      a code of a look-up table generating step of generating the look-up table in accordance with the inputted measurement result,
   wherein the code of said adjusting step includes:
      a code of an adjusting range inputting step of inputting, in accordance with a user's operation, a specific color and an adjusting range corresponding to the specific color, and
      a code of a look-up table adjusting step of selecting and adjusting lattice-points of the generated look-up table corresponding to the inputted specific color and adjusting range thereof,
      wherein a predetermined value corresponding to a kind of a representative color is preset as a default range of the adjusting range, and
      when the representative color is selected as the specific color, and the adjusting range is changeable in accordance with user's operation.

* * * * *

UNITED STATES PATENT AND TRADEMARK OFFICE
CERTIFICATE OF CORRECTION

PATENT NO.    : 6,373,980 B2
DATED         : April 16, 2002
INVENTOR(S)   : Kenichi Ohta It is certified that error appears in the above-identified patent and that said Letters Patent is hereby corrected as shown below:

Column 3,
Line 64, "art." should read -- art; --.

Column 4,
Line 36, "as" should read -- at --.

Column 7,
Line 65, "R1XG1)" should read -- (R1XG1) --.

Column 8,
Line 11, "C11)" should read -- C111) --.

Column 12,
Line 33, "FIG. 1" should read -- FIG. 2 --.

Column 13,
Line 31, "calo-" should read -- colo-- --.

Column 14,
Line 10, "color converter 22" should read -- color converter 202 --.

Column 16,
Line 29, "the each embodiments" should read -- each embodiment --.
Line 61, "user's's" should read -- user's --.

Column 17,
Line 12, "color," should read -- colors, --.
Line 51, "theron" should read -- thereon --.

UNITED STATES PATENT AND TRADEMARK OFFICE
CERTIFICATE OF CORRECTION

PATENT NO. : 6,373,980 B2
DATED : April 16, 2002
INVENTOR(S) : Kenichi Ohta

It is certified that error appears in the above-identified patent and that said Letters Patent is hereby corrected as shown below:

<u>Column 18,</u>
Line 51, "and" should be deleted.

Signed and Sealed this

Sixteenth Day of July, 2002

*Attest:*

*Attesting Officer*

JAMES E. ROGAN
*Director of the United States Patent and Trademark Office*